(12) United States Patent
Schwarz

(10) Patent No.: US 10,166,630 B2
(45) Date of Patent: Jan. 1, 2019

(54) OPTICAL MEASURING DEVICE FOR MONITORING A JOINT SEAM, JOINING HEAD AND LASER WELDING HEAD WITH SAME

(75) Inventor: Joachim Schwarz, Kleinadelfingen (CH)

(73) Assignee: PRECITEC KG, Gaggenau-Bad, Rotenfels (DE)

( * ) Notice: Subject to any disclaimer, the term of this patent is extended or adjusted under 35 U.S.C. 154(b) by 1448 days.

(21) Appl. No.: 13/525,066

(22) Filed: Jun. 15, 2012

(65) Prior Publication Data
US 2012/0318775 A1 Dec. 20, 2012

(30) Foreign Application Priority Data

Jun. 17, 2011 (DE) .......................... 10 2011 104 550

(51) Int. Cl.
| | |
|---|---|
| B23K 26/00 | (2014.01) |
| B23K 26/03 | (2006.01) |
| G01B 11/06 | (2006.01) |

(52) U.S. Cl.
CPC ........ B23K 26/032 (2013.01); G01B 11/0608 (2013.01)

(58) Field of Classification Search
CPC .......................... B23K 26/032; G01B 11/0608
USPC ............ 219/121.62, 121.71, 121.72, 121.83, 219/121.85, 121.64, 121.67; 382/151, 382/152, 199, 266, 100, 150, 154
See application file for complete search history.

(56) References Cited

U.S. PATENT DOCUMENTS

| | | | | |
|---|---|---|---|---|
| 6,671,042 B1* | 12/2003 | Almogy | ..................... | 356/237.3 |
| 2003/0197791 A1* | 10/2003 | Ogino | ........................ | 348/218.1 |
| 2005/0041852 A1* | 2/2005 | Schwarz et al. | ............. | 382/152 |
| 2005/0247681 A1* | 11/2005 | Boillot et al. | ........... | 219/121.63 |
| 2008/0232677 A1* | 9/2008 | Schwarz | ........................ | 382/152 |
| 2009/0266989 A1* | 10/2009 | Schwarz | .................... | 250/358.1 |
| 2009/0302011 A1* | 12/2009 | Behr et al. | ............... | 219/121.64 |
| 2010/0134628 A1 | 6/2010 | Pfitzner et al. | | |

(Continued)

FOREIGN PATENT DOCUMENTS

| | | |
|---|---|---|
| DE | 19505832 | 8/1996 |
| DE | 69628956 | 5/2004 |
| DE | 102009018464 | 11/2010 |

(Continued)

*Primary Examiner* — Thien S Tran
(74) *Attorney, Agent, or Firm* — Muncy, Geissler, Olds & Lowe, P.C.

(57) ABSTRACT

An optical measuring device for monitoring a joint seam, joining head and laser welding head. The optical measuring device monitors a joining region in a workpiece and has at least one light-section device with a first light source for casting a light fan in the direction of the workpiece to be joined, making a triangulation light line within the joining region which intersects a joint seam. An illumination device with a second light source homogeneously illuminates the joining region. A first optical sensor with a first observation beam path for spatially resolved imaging of the triangulation light line is projected onto the joint seam. A second optical sensor with a second observation beam path for spatially resolved imaging of the joint seam is coaxially coupled with the first observation beam path. The readout rate of the first and second optical sensors is >1 kHz and <500 Hz, respectively.

12 Claims, 6 Drawing Sheets

(56) References Cited

U.S. PATENT DOCUMENTS

2011/0190639 A1* 8/2011 Peltie et al. .............. 600/476

FOREIGN PATENT DOCUMENTS

| DE | 102009042986 | | 3/2011 | |
|----|--------------|---|--------|---|
| JP | S6250605 | A | 3/1987 | |
| JP | H 106006 | A | 1/1998 | |
| JP | 2005241312 | A | 9/2005 | |
| JP | 2009505705 | A | 4/2009 | |
| JP | 2010502447 | A | 1/2010 | |
| WO | WO2005/095043 | | 10/2005 | |
| WO | WO2007/053973 | | 5/2007 | |
| WO | WO 2007053973 A1 * | | 5/2007 | ............. B23K 9/127 |
| WO | WO2008/028580 | | 3/2008 | |

* cited by examiner

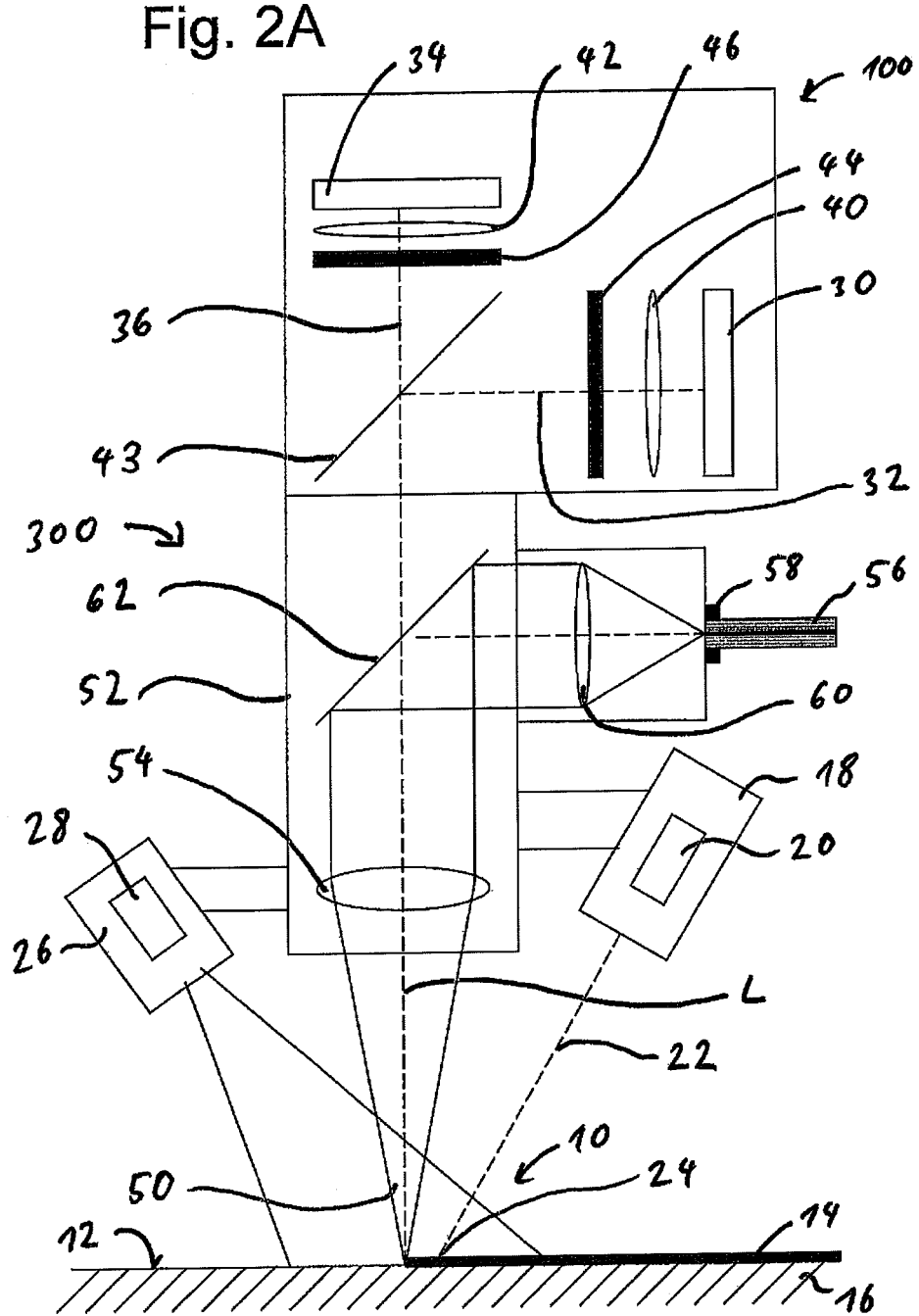

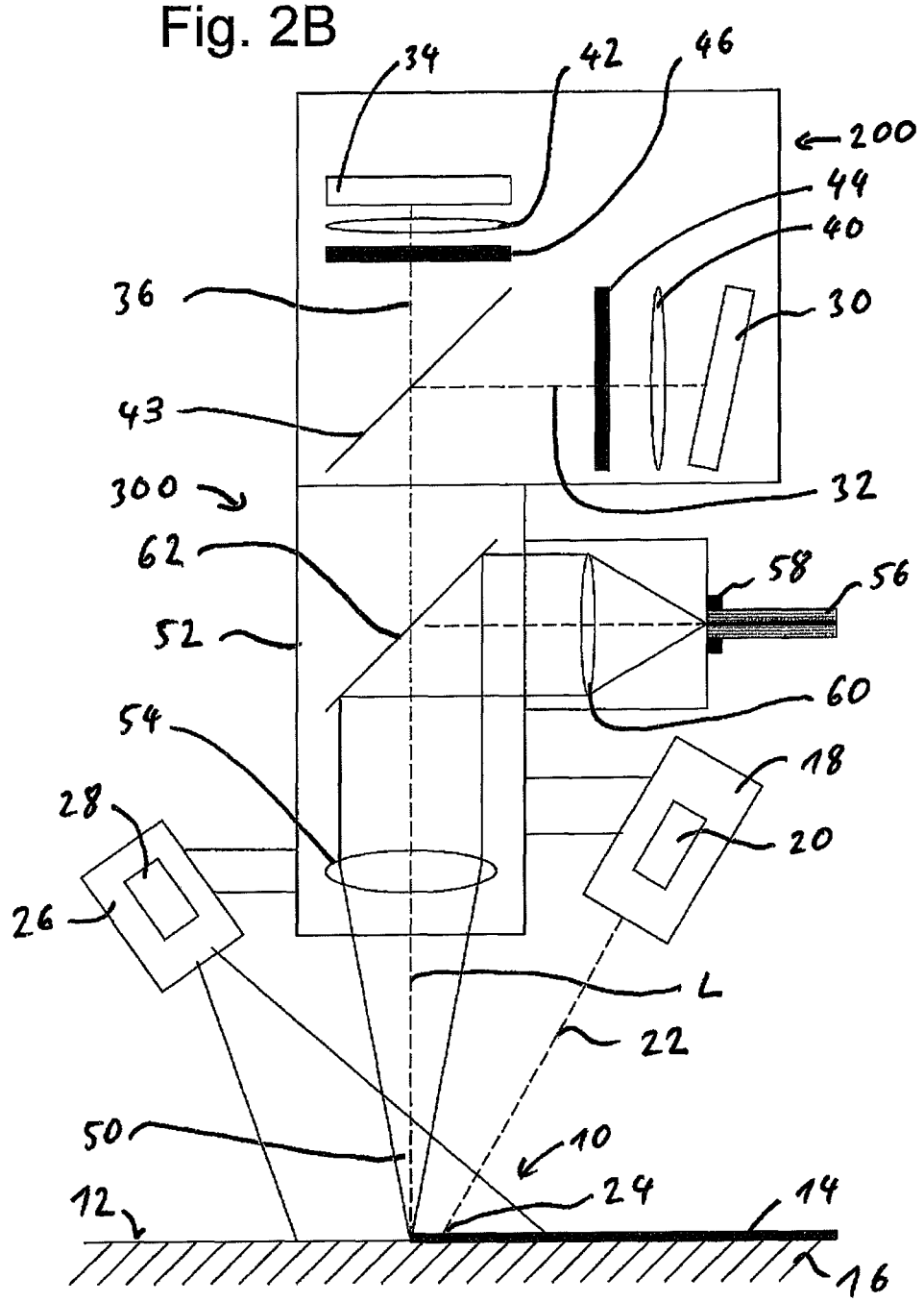

OPTICAL MEASURING DEVICE FOR MONITORING A JOINT SEAM, JOINING HEAD AND LASER WELDING HEAD WITH SAME

BACKGROUND OF THE INVENTION

(1) Field of the Invention

The invention relates to an optical measuring device for monitoring a joint seam, a joining head and a laser welding head with same.

(2) Description of the Related Art

A joining head can be used to join a gap in a workpiece or between two workpieces, with a joint seam being produced by the joining process. For the purposes of the joining process, use can be made of laser welding heads, with a workpiece being processed using a laser beam, for example for carrying out welding or soldering work for joining the gap. Moreover, use can be made of gas metal arc welding heads for joining a gap in a workpiece. Finally, it is also feasible to bond together workpieces to be joined, with an adhesive bead being applied onto one workpiece, said adhesive bead bringing about the bonding to another workpiece. In all processes it is necessary to monitor the quality of the produced welding or soldering seams. Thus, welding connections, which were either produced by means of a laser, or else metal inert gas connections or metal active gas connections have to be subjected to a full inspection. Furthermore, adhesive beads are subjected to an inspection prior to bonding. Build-up welds must be inspected before further processing. The high production speeds coupled with the low error tolerances lead to the use of optical measuring and inspection systems, which can measure and inspect the connections at high speeds without contact.

DE 195 05 832 A1 has disclosed an inspection apparatus, in which interconnected workpiece parts are held at a predetermined distance from a sensor unit by means of a guide unit. A seam searching unit comprises an optical sensor, in the measuring field of which the seam is situated, and an evaluation unit connected downstream of the sensor and supplies information in respect of the position of the seam.

Depending on the information in respect of the position of the seam, a 2D sensor, which may be embodied as a CMOS matrix camera and whose measuring field is substantially tuned to the width of the seam, is positioned by means of an actuator such that the measuring-field centre thereof and the seam centre correspond. Moreover, depending on the information in respect of the position of the seam, a 3D seam profile sensor is positioned by an actuator such that seam centre and measuring-field centre correspond. In this case, the 3D seam profile sensor operates according to the light-section process in conjunction with a light-beam triangulation.

WO 2005/095043 A1 has disclosed the practice of integrating different sensors into a processing head. In this case, a first workpiece region is imaged on a first sensor prior to processing and a second workpiece region is imaged on a second sensor after the processing by the processing head. Both sensors capture the image of a triangulation line, with a downstream processing unit evaluating the latter. Thus, work is performed with a number of sensors during the simultaneous evaluation of the image data before the process, i.e. capturing the joining position, and after the process, i.e. the welding or soldering seam. In this case, each sensor records its own object region, which are then evaluated separately from one another.

US 2010/0134628 A1 has disclosed the spatially resolved evaluation of radiation emitted by the workpiece during a laser processing process, with different sensors being respectively used for different wavelength ranges.

For the purposes of fault detection, independently of the advance speed, of very small local faults in a joint seam in conjunction with a three-dimensional measurement, it is therefore necessary first to capture local faults and to measure the seam length and position and also to determine the geometric data of the joint seam, such as convexity, concavity and optionally edge offset, in order to ensure that ISO limits are complied with. To this end, it is furthermore necessary to measure the seam volume of the joint seam because a single measured value such as e.g. the concavity provides no information in respect of the seam cross section. Moreover, it is necessary to measure a workpiece in the surroundings of the connection position.

Measuring the geometric data requires fast 3D measurement of the joint seam; the identification of local faults requires the evaluation of a greyscale image with a very high resolution and with simultaneous fast object movement.

Capturing an object region by means of a triangulation line, for example following the welding process, and capturing the processed object region require completely different sensor and imaging properties. Fast scanning of a welding seam by means of triangulation and recording this region by means of incident illumination likewise requires different data rates and sensor properties.

There is no optimum spatial representation of the surfaces in the case of the two methods considered separately. One obtains either a two-dimensional image with the visualization of the surface texture or a topographic image without information relating to the texture.

BRIEF SUMMARY OF THE INVENTION

Therefore the invention is based on the object of developing an optical measuring device for monitoring a joint seam, which simultaneously enables fast 3D measurement of the joint seam and the identification of local faults with a very high resolution with, at the same time, fast object movement, and also a joining head or a laser welding head which has such a measuring device.

This object is achieved by the optical measuring device, by the joining head and by the laser welding head according to the claims. Advantageous embodiments and developments of the invention are presented in the dependent claims.

Hence, according to the invention, provision is made for an optical measuring device for monitoring a joining region in a workpiece, which measuring device comprises at least one light-section device with a first light source, which is suitable for casting a light fan in the direction of the workpiece to be joined in order to create a triangulation light line within the joining region on the workpiece to be joined, which triangulation light line intersects a joint seam in the joining region, and an illumination device with a second light source for homogeneous illumination of the joining region of the workpiece to be joined. The optical measuring device furthermore comprises a first optical sensor with a first observation beam path for spatially resolved imaging of the triangulation light line projected onto the joint seam and a second optical sensor with a second observation beam path for spatially resolved imaging of the joint seam. Here, the second observation beam path is coaxially coupled into the first observation beam path and the readout rate of the first optical sensor is greater than 1 kHz and the readout rate of the second optical sensor is less than 500 Hz. However, it is also preferred if the readout rate of the first optical sensor is greater than 3 kHz and the readout rate of the second optical sensor is less than 100 Hz.

Thus, according to the invention, provision is made for an optical measuring device, by means of which a joint seam in a workpiece, more particularly a welding seam, can be measured optically, with the measuring device being used either for online monitoring or for a subsequent inspection of a produced joint seam. According to the invention, the optical measuring device has two spatially resolving sensors such as e.g. CMOS cameras in this case, which sensors are tuned to two different objects in terms of their imaging properties and their readout rates. Thus, the first optical sensor records an image of a triangulation laser line projected onto the workpiece and the second sensor records a greyscale image for identifying fault positions in the joint seam. Imaging on the sensor areas of the two sensors is brought about by means of a common objective lens and respectively associated ocular lenses. This makes it possible to create a very compact and robust measuring device, in which the sensors are arranged fixed in space with respect to one another in order to generate a three-dimensional mapped illustration of the joint seam by evaluating the two-dimensional greyscale value image and the profile of the laser triangulation line.

Thus, according to the invention, an optical measuring device is created which, at the same time, enables a high resolution, a large object field, a large dynamic range, a high object-recognition rate, the evaluation of different or the same object regions with completely different sensor properties and the visualization of the spatial and textural properties of the workpiece.

For a simple implementation of the coaxial coupling of the first observation beam path into the second observation beam path it is advantageous if the second observation beam path of the second optical sensor is coaxially coupled into the first observation beam path of the first optical sensor via a first beam splitter, with the first and the second optical sensor using a common objective lens.

In order to achieve a high depth of field of the triangulation laser line projected onto the workpiece and the joint seam, it is particularly advantageous if the sensor surface of the second optical sensor and the light fan, to be projected onto the workpiece, of the at least one light-section device are arranged with respect to one another such that the Scheimpflug condition is satisfied for the image of the triangulation light line which intersects the joint seam.

For optimum assessment of the quality of the joint seam it is particularly advantageous if the optical measuring device furthermore comprises an image processing unit, which images the image data from the second optical sensor onto a grid model of a topographic image obtained by evaluating the profile of the triangulation light line in order to generate a calculated model view of a three-dimensional joint seam.

It is furthermore preferable for the first optical sensor to have a linear characteristic and the second optical sensor to have a lin-log characteristic.

In order to tune the first and second optical sensors to their respective objects in an optimum manner, it is expedient if there is size-reducing imaging on the sensor area of the first optical sensor by means of the first observation beam path and if there is substantially isometric imaging on the sensor area of the second optical sensor by means of the second observation beam path.

For the purpose of masking unwanted light, particularly when monitoring a laser welding process, it is advantageous if optical band-pass filters are provided upstream of the first and second optical sensor in the first and second observation beam path, the pass wavelength ranges of which optical band-pass filters being tuned to the emission wavelengths of the first light source of the light-section device and the second light source of the at least one illumination device.

For optimum illumination and a resultant high resolution of the surface structure of the joint seam, it is expedient if the at least one illumination device comprises at least one first illumination module and at least one second illumination module, with the at least one first illumination module being provided for illuminating the joining region at a small angle to the optical axis of the objective lens and the at least one second illumination module being provided for illumination at a large angle to the optical axis of the objective lens.

Here, it is advantageous if the at least one first illumination module for illumination at a small angle and the at least one second illumination module for illumination at a large angle are connected to a control device, which, as a result of different actuation of the at least one first illumination module and of the at least one second illumination module at different periods of time, alternates between a dark-field and a bright-field illumination or sets a ratio of the intensities of the bright-field illumination and the dark-field illumination with respect to one another.

In the process, it is advantageous if the at least one illumination device comprises at least one illumination module which is embodied as an LED module and operated in a pulsed manner.

Here, the first light source of the at least one light-section device expediently comprises a diode laser.

According to the invention, provision is furthermore made for a joining head for joining a workpiece by means of a joining device which uses the measuring device according to the invention.

Here, the joining device can expediently be a laser-welding device, a gas metal arc welding device or an adhesive-bead device.

According to the invention, provision is furthermore made for a laser welding head for welding a workpiece by means of a laser beam, said laser welding head comprising a housing, through which a beam path for the laser beam is routed and which has a focussing optical system for focussing the laser beam onto a joining position, of the workpiece to be joined, within a joining region, and an optical measuring device, with the at least one light-section device being fixedly connected to the housing such that the light fan cast onto the workpiece to be joined is at a fixed angle to the optical axis of the focussing optical system, and with the first and second observation beam path being coaxially coupled into the laser beam path by means of a second beam splitter.

BRIEF DESCRIPTION OF THE SEVERAL VIEWS OF THE DRAWINGS

The invention will be explained in more detail below on the basis of the drawing, in which:

FIG. 2A shows a greatly simplified schematic view of a laser welding head with an optical measuring device as per the first exemplary embodiment of the invention, FIG. 2B shows a greatly simplified schematic view of a laser welding head with an optical measuring device as per the second exemplary embodiment of the invention.

Mutually corresponding components have been provided with the same reference sign in the various figures of the drawings.

DETAILED DESCRIPTION OF THE INVENTION

Figure 1A:
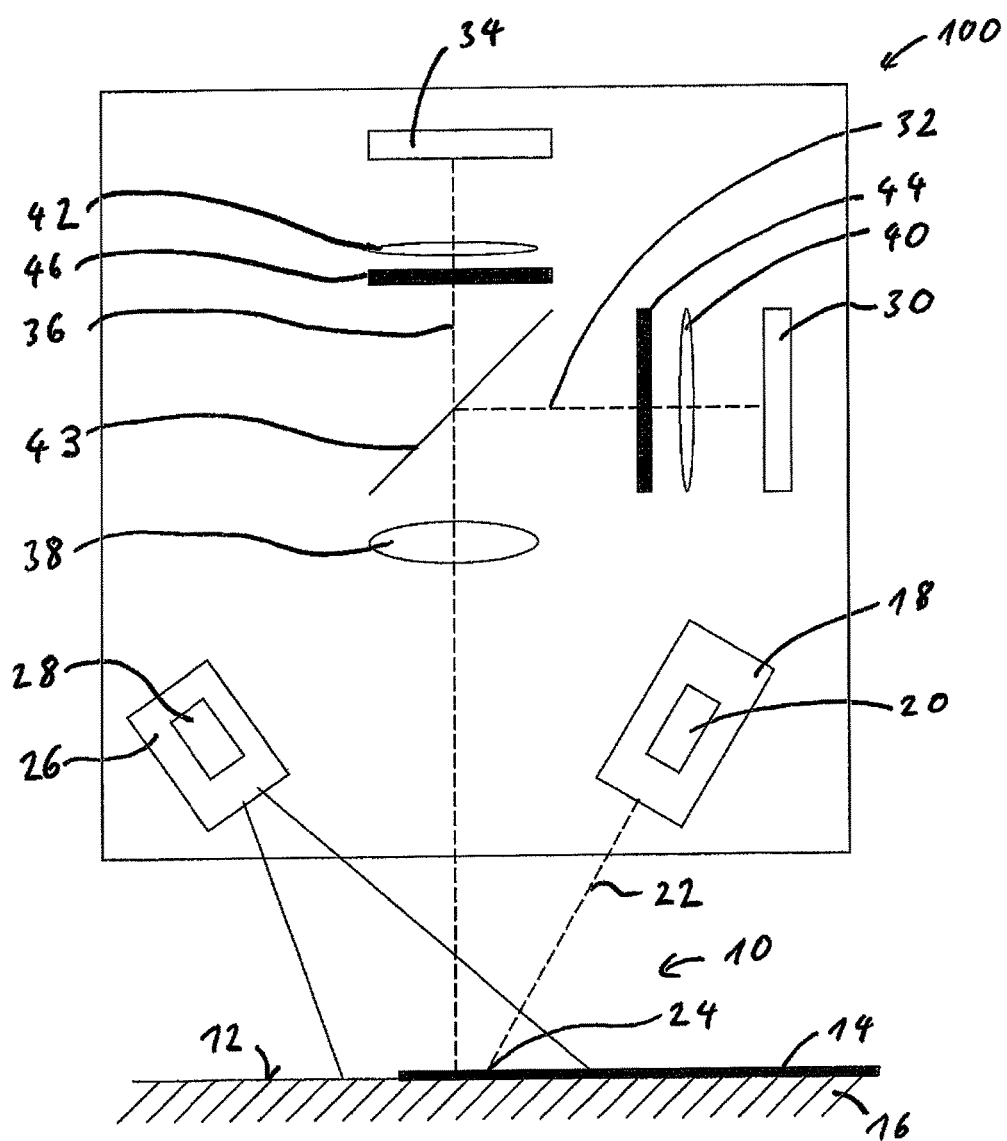
FIG. 1A shows a greatly simplified schematic view of an optical measuring device as per a first exemplary embodiment of the invention.

A greatly simplified schematic view of an optical measuring device 100 as per a first exemplary embodiment of the invention is shown in FIG. 1A. The optical measuring device 100 is provided for monitoring in a workpiece 16, during a joining process, a joining region 10 (FIG. 3) having a region 12 to be joined and a joint seam 14. However, the optical measuring device 100 can also be provided for inspecting an already completed joint seam 14. In this case, the joining region 10 only has the joint seam 14.

The optical measuring device 100 comprises at least one light-section device 18 with a first light source 20, which is suitable for casting a light fan 22 in the direction of the workpiece 16 to be joined in order to create a triangulation light line 24 within the joining region 10 on the workpiece 16 to be joined, which triangulation light line intersects the joint seam 14, and at least one illumination device 26 with a second light source 28 for homogeneous illumination of the joining region 10 of the workpiece 16 to be joined. The optical measuring device 100 according to the invention furthermore comprises a first optical sensor 30 which, in a spatially resolved manner, images the light line 24 projected onto the workpiece 16 and the joint seam 14 via a first observation beam path 32, and a second optical sensor 34 which, in a spatially resolved manner, images the joining region 10 and more particularly the joint seam 14 on the surface of the workpiece 16 via a second observation beam path 36. Here, the first and second optical sensors 30, 34 are preferably embodied as CCD-matrix camera sensors, more particularly as CMOS camera sensors.

Imaging on the first sensor 30 and the second optical sensor 34 is brought about via an objective lens 38, which is jointly used by the first optical sensor 30 and the second optical sensor 34, and via a first ocular lens 40, arranged upstream of the first optical sensor 30 in the observation direction, and via a second ocular lens 42, arranged upstream of the second optical sensor 34 in the observation direction. Here, the second observation beam path 36 of the second optical sensor 34 is coaxially coupled into the first observation beam path 32 of the first optical sensor 30 via a first beam splitter 43. Furthermore, provision can also be made for a first optical filter 44 and a second optical filter 46 in front of the first optical sensor 30 and the second optical sensor 34 respectively, the functionality of which filters will be explained in more detail below. Here, the optical filters 44, 46 can be arranged in the respective observation beam paths 32, 36 between the first beam splitter 43 and the corresponding optical sensors 30, 34, with said optical sensors preferably being arranged between the first beam splitter 43 and the ocular lenses 40, 42.

Figure 1B:
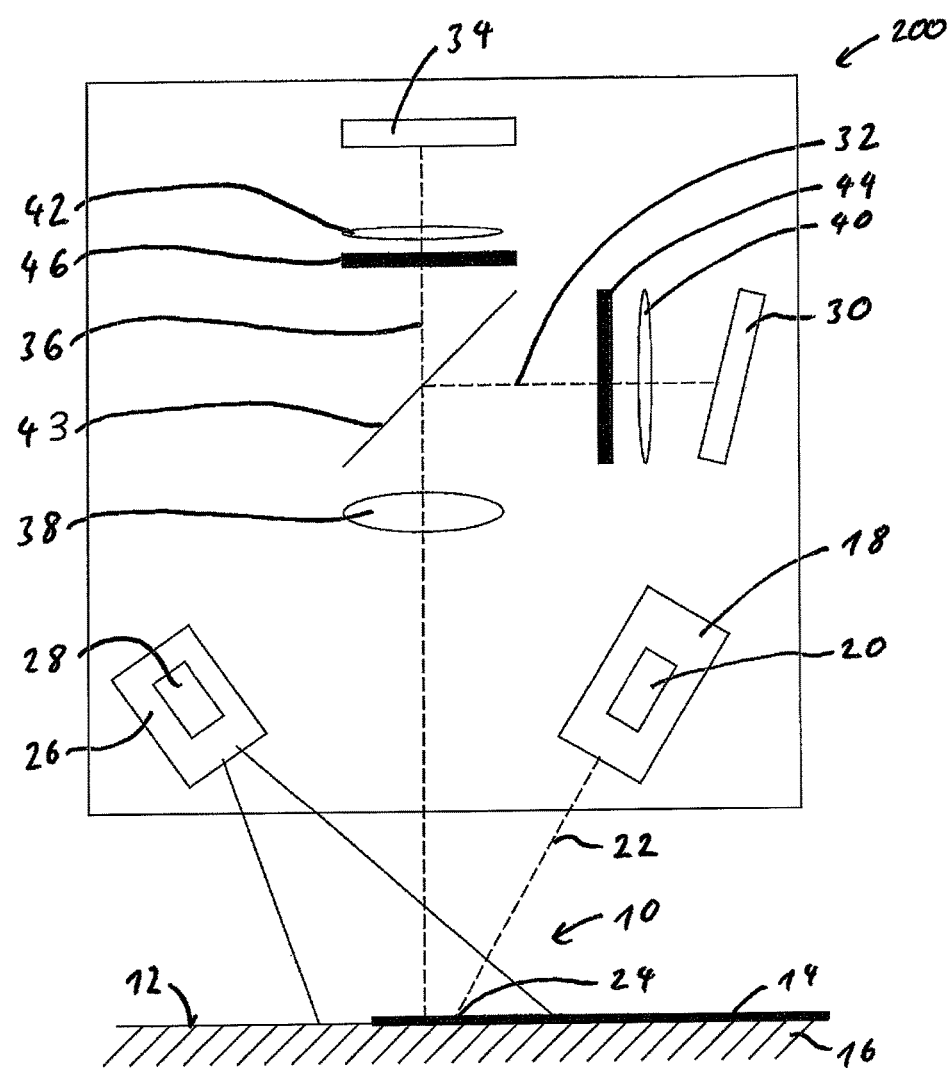
FIG. 1B shows a greatly simplified schematic view of an optical measuring device as per a second exemplary embodiment of the invention.

FIG. 1B shows a greatly simplified schematic view of an optical measuring device 200 as per a second exemplary embodiment of the invention. The optical measuring device 200 differs from the optical measuring device 100 as per the first exemplary embodiment of the invention by virtue of the fact that the sensor area of the first optical sensor 30 is not arranged perpendicularly to the first observation beam path 32, but rather it is tuned to the optical systems 38, 43 and 40 and to the orientation of the light fan 22 of the light-section device 18 such that the Scheimpflug condition is satisfied for the image of the triangulation light line 24, as will still be explained in more detail below.

According to the invention, provision is made not only for an optical measuring device 100 or 200 for monitoring a joining region 10 in a workpiece 16, but also for a joining head which uses the optical measuring device 100 or 200 according to the invention. By way of example, a joining head according to the invention can be embodied as laser welding head 300 (as e.g. shown in FIGS. 2A and 2B), as gas metal arc welding head or as adhesive-bead head. In general, a joining head should be understood to mean any device which can be used for producing a joint seam for joining a workpiece or two different workpieces. Here, the joint seam 14 can be the seam connecting the workpieces; however, it is also feasible for an adhesive-bead head to apply an adhesive bead to a workpiece and for this adhesive bead to be inspected during application in terms of its quality by means of the optical measuring device 100, 200 according to the invention. After the inspection, a second workpiece is applied to the applied adhesive bead and pressed against the workpiece to be bonded in order to create an adhesive bond.

FIGS. 2A and 2B show a greatly simplified view of a joining head according to the invention, which is embodied as a laser welding head 300 and uses the optical measuring device 100 according to the invention as per the first exemplary embodiment or the optical measuring device 200 according to the invention as per the second exemplary embodiment.

In order to be able to carry out a welding or soldering procedure on the workpiece 16 at a joining position 48 (FIG. 3), a work laser beam 50 coming from a laser processing machine is routed through a housing 52 of the laser welding head 300 onto the workpiece 16 and focussed on the workpiece 16 by means of a focussing optical system 54, as indicated by the optical axis L. The laser light of the work laser beam 50 focussed on the joining position 48 in the joining region 10 melts material of the workpiece 16 or of a number of workpieces that should be connected, as a result of which welding of the workpiece 16 or of a number of different workpieces can take place. However, it is also possible that there is soldering of the workpiece 16 or of different workpieces.

The work laser beam 50 is routed to the laser welding head 300 through an optical fibre 56, wherein the fibre end of the optical fibre 56 is held in a fibre holder 58. The laser beam 50 emerging at the fibre end of the optical fibre 56 is collimated by means of a collimator optical system 60 and directed to a second beam splitter 62 which deflects the laser beam 52 in the direction of the focussing optical system 54.

In the exemplary embodiment of the invention shown in FIGS. 2A and 2B, the at least one light-section device 18 and the at least one illumination device 26 are attached to the housing 52 of the laser welding head 300, with the light-section device 18 preferably being fixedly connected to the housing 52 such that the light fan 22 cast onto the workpiece 16 to be joined is at a fixed angle to the optical axis L of the focussing optical system 54. The first observation beam path 32 of the first optical sensor 30 and the second observation beam path 36 of the second optical sensor 34 are coaxially coupled into the beam path of the work laser beam 50 via the second beam splitter 62.

As a result of integrating the optical measuring device 100 or 200, as shown in FIGS. 2A and 2B, into a laser welding head 300 according to the invention, it is thus possible to carry out online monitoring of the joint seam 14, which is a welding seam in this case, formed by the work laser beam 50.

The optical measuring device 100, 200 according to the invention and a joining head or a laser welding head 300 which use said measuring device are particularly advantageously suitable for inspecting or measuring a joint seam 14, as will be explained below.

In the optical measuring device 100, 200 according to the invention, two optical measuring methods, a three-dimensional measurement of the joint seam 14 by a triangulation method and two-dimensional imaging of the surface of the joint seam 14 are combined in a particularly suitable manner by virtue of the fact that two optical sensors (the first optical sensor 30 and the second optical sensor 34) with different properties that are tuned to the respective measurement method are housed in a sensor system with a common optical system.

The 3D measuring system with the at least one light-section device 18 and the first optical sensor 30 should be presented first of all.

Figure 3:
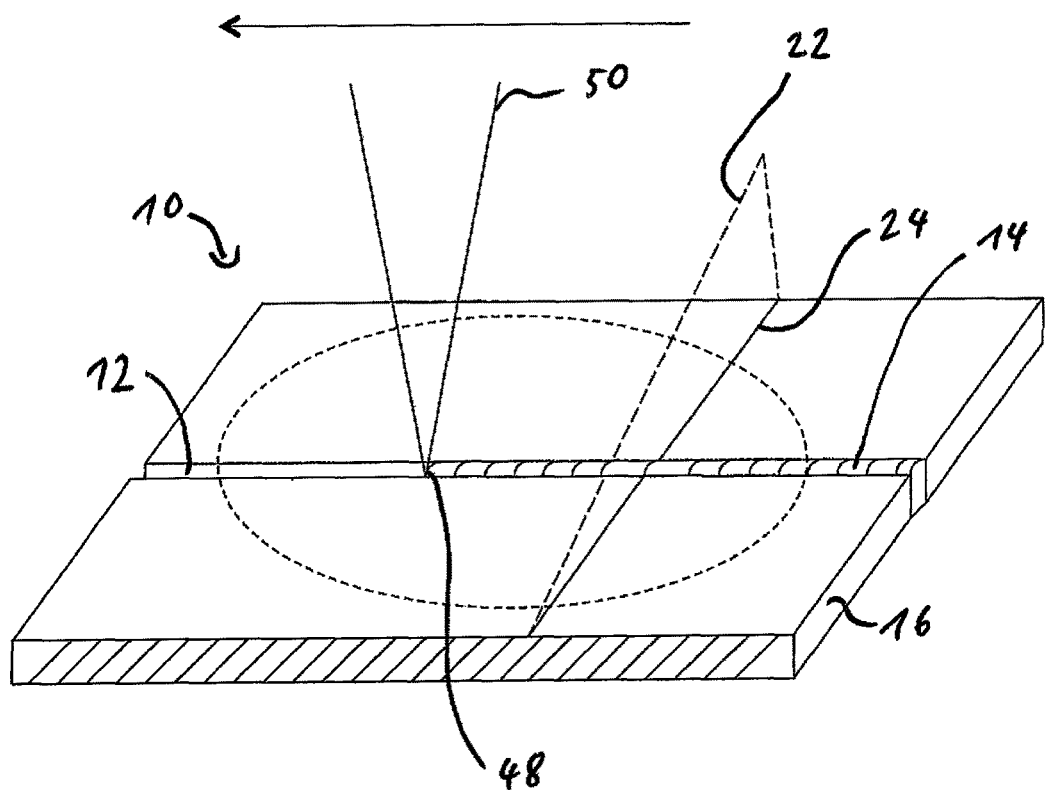
FIG. 3 shows a perspective schematic view of a joining region during a joining process on a workpiece.

As shown in FIGS. 2A, 2B and 3, at least one light fan 22 is cast in the direction of the workpiece 16 by means of the at least one light-section device 18 in order to project onto the workpiece 16 a light line 24 which intersects the joint seam 14. A diode laser with 50 mW to 100 mW optical power and a wavelength of 660 nm is preferably used as first light source 20 of the light-fan device 18. Here, the first optical filter 44 is embodied as an optical band-pass filter, the transmission wavelength pass range being tuned to the emission wavelength of the first light source 20 of the light-section device 18, with the full width at half maximum (FWHM) of the wavelength pass range of the optical band-pass filter 44 preferably being less than 100 nanometers, particularly preferably less than 50 nanometers and more particularly less than 20 nanometers. The first optical band-pass filter 44 preferably is a Fabry-Perot filter or a Fabry-Perot etalon, with electromagnetic waves with a specific frequency range being passed by this type of filter and the remaining frequency components being cancelled by interference. AlGaInP laser diodes with multi-quantum well structures, which have an emission maximum in a wavelength region between 635 nanometers and 670 nanometers are also suitable as further light sources for the first light source 20. Thus, for example, use can be made of a laser diode with an emission wavelength of 658 nanometers and an emission power of 60 mW. Thus, as a result of using the first optical filter 44, embodied as an optical band pass, only the triangulation light line 24 projected onto the workpiece is imaged on the sensor area of the first optical sensor 30, with unwanted light influences, in particular reflections of the work laser beam or emissions of the weld pool formed in the workpiece in the case of a laser welding procedure, being largely eliminated.

As furthermore shown in FIGS. 1A, 1B and 3, the plane of the light fan 22 is not parallel to the optical axis of the objective lens 38 or to the optical axis L of the focusing lens 54. Since, during a joining process, the workpiece surface is generally held perpendicularly on the optical axis L of a focussing lens 52 for a work laser beam 50 or perpendicular to an optical axis of an objective lens 38, a vertical deflection level with the surface of the workpiece 16 leads to a horizontal deflection of the laser light line 24 on the workpiece surface, as shown in FIG. 3. Thus, as a result of this so-called triangulation method, it is possible to create a height profile of the joint seam 14 if the angle between the light fan 22 and the workpiece surface is known, either by casting a multiplicity of parallel light fans onto the workpiece or by periodically capturing and buffering the height profile data during the scan by means of the triangulation light line 24. In the embodiment of the invention shown in FIG. 1B, the sensor surface of the first optical sensor 30 is tuned to the plane of the light fan 22 such that the triangulation light line 24 is always imaged in focus on the sensor area. This is achieved by virtue of the fact that, taking into account the optical components 38, 43 and 40, the plane of the sensor area of the first optical sensor 30 and the plane of the light fan 22 satisfy the so-called Scheimpflug condition. The Scheimpflug condition is satisfied, i.e. the desired object plane (corresponding to the plane of the light fan 22) is imaged with maximum sharpness, if object plane, objective plane and image plane (corresponding to the plane of the sensor area of the first optical sensor 30) intersect at a common line. Hence, in the case of the measurement device 200 as per the second exemplary embodiment of the invention, a sensor area, which is arranged slightly tilted with respect to the ocular lens 40, of the first sensor device 30 leads to the laser light line 24 being imaged in a spatially resolved fashion on the sensor area of the first optical sensor 30 with optimum sharpness, independently of the height profile of the joint seam 14, as result of which an even more precise measurement of the height profile of the joint seam 14 is rendered possible.

The first optical sensor 30 is moreover optimized in respect of the image recording rate thereof in order to capture the one or more triangulation lines 22 quickly, as a result of which a two-dimensional evaluation of the height profile of the joint seam 14 is rendered possible at high joining speeds. In this case, the readout rate of the first optical sensor 30 is preferably greater than 1 kHz, more preferably greater than 2 kHz, particularly preferably greater than 3 kHz and, in particular, the readout rate lies at up to a 3.5 kHz scanning rate. It is for this reason that the very fast optical spatially resolved first sensor 30 preferably has a linear characteristic. Since the laser line 24 only needs to be visualized with approximately unchanging intensity, this property does not pose any restriction for the use as triangulation sensor because no great dynamic range is required for imaging the laser line 24. In the case of sensors with linear characteristics, data rates of up to 600 MByte per second are possible. Typical welding seams in the case of laser welding have a width of 2 to 3 mm. Since the typically utilized triangulation laser lines have a width of approximately 30 μm, imaging with a size reduction of 3:1 is sufficient.

Thus, in the case of a 1-inch sensor with a sensor width of approximately 10 mm, it is possible to image a 30 mm×30 mm object field on a 10 mm×10 mm sensor area. In the case of a relevant image region (ROI) dimension of 600 pixels× 150 pixels, this results in an up to 3.5 kHz scanning rate for the triangulation. The triangulation line 24 can be extracted directly from the image by an FPGA (field-programmable gate array). Hence, only topographic images are transmitted to an evaluation apparatus. Thus, the object region scanned thereby is 18 mm×4.5 mm. By using the whole sensor width of the first optical sensor 30, which totals 1000 pixels, it is possible to scan and measure an object region with a width of 30 mm. Moreover, in the case of the arrangement of the first optical sensor 30 as per the second exemplary embodiment of the invention shown in FIG. 1B, a large depth of focus for imaging the triangulation is achieved because the Scheimpflug condition is upheld.

In the following text, the 2D measuring system for two-dimensional imaging of the joint seam 14, with at least one illumination device 26 and the second optical sensor 34 will be explained in more detail.

The second optical sensor 34 is preferably a greyscale image sensor, which is optimized for capturing a greyscale image. Thus, according to the invention, an imaging ratio of 1:1 is selected for imaging the joint seam 14 on the sensor area of the second optical sensor 34; this is done in order to be able, if possible, to detect small faults within the joint seam 14 as well. An object field of 5 mm×5 mm is typically scanned. The data rate of the second optical sensor 34 must merely be fast enough to ensure sufficient overlap of the object regions at the inspection advance speed or at the joining speed. In the case of an exemplary inspection speed of 250 mm per second, this means a frame rate of 50 frames per second. In this case, the readout rate of the second optical sensor 34 is preferably less than 500 Hz, more preferably less than 200 Hz and particularly preferably less than 100 Hz. The second optical sensor 34 preferably has a lin-log characteristic in order, as a result of its great dynamic range, to do justice to the reflection properties of welding or soldering seams in an optimum fashion. The homogenous illumination of the joining region 10 by means of the at least one illumination device 26 is preferably brought about using a second light source 28 which is embodied as a light-emitting diode. Here, the incident direction of the illumination can be tuned to the corresponding application. The wavelength of the light-emitting diode 28 is preferably 620 nanometers. By using a second optical filter 46, which is embodied as an optical band-pass filter, only the component of the diode illumination from the second light source 28 is imaged on the sensor area of the second optical sensor 34. The explanations above in respect of the first optical filter 44 should also hold true for the properties of the second optical filter 46. In order to achieve a high luminous intensity, the second light source 28 of the at least one illumination device 26 can be operated in a pulsed manner, with use preferably being made of LED modules for this purpose.

Figure 4:
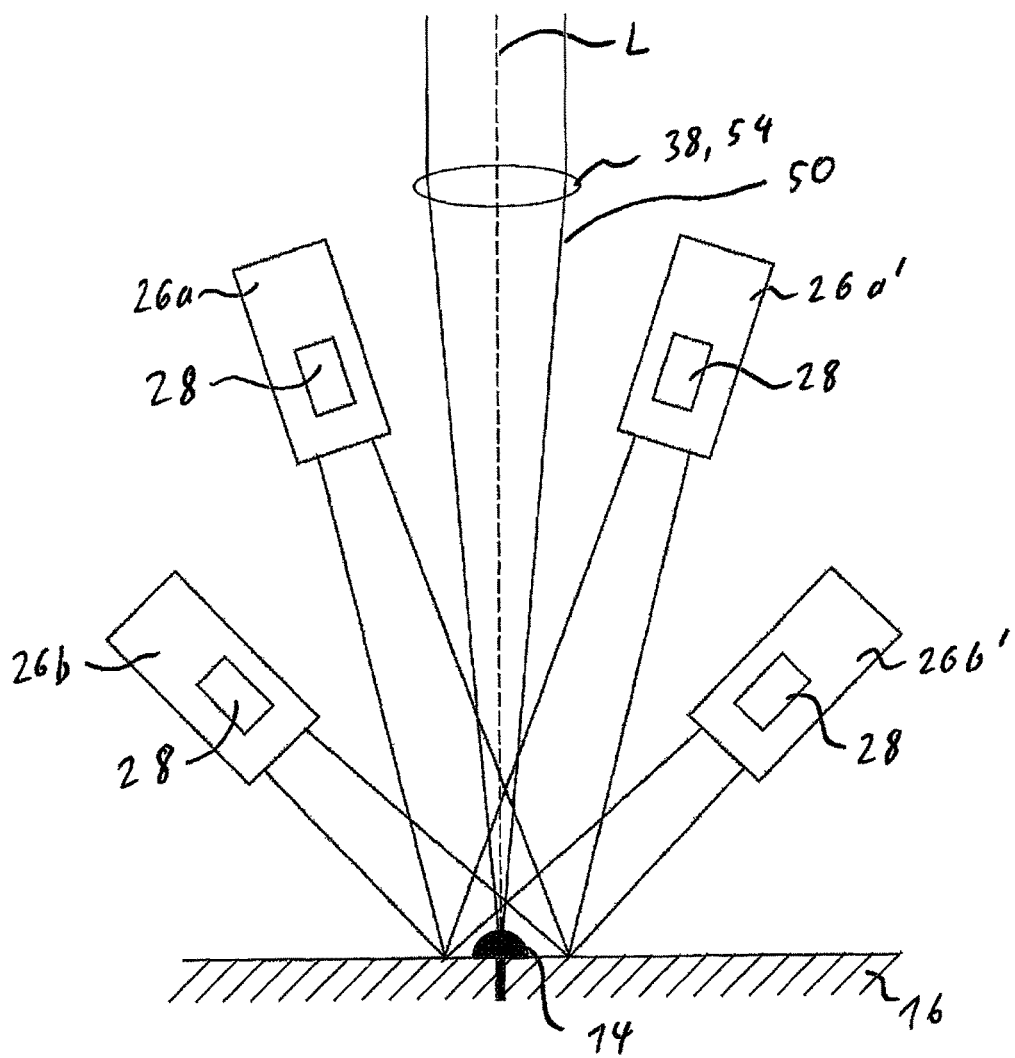
FIG. 4 shows a greatly simplified schematic view of an at least one illumination device as per an exemplary embodiment of the invention.

As shown in FIG. 4, four illumination or LED modules 26a, 26a', 26b and 26b' can be used for optimum illumination of the joint seam 14. Here, two illumination modules 26a and 26a' are provided for illumination at a small angle to the optical axis of the objective lens 38 or to the optical axis L of the focussing lens 54, and two further illumination modules 26b, 26b' are provided for illumination at a large angle to the optical axis of the objective lens 38 or of the focussing lens 54. Here, a small angle should be understood to mean an angle between 1° and 45°, more particularly between 1° and 30°, and a large angle should be understood to mean an angle between 45° and 89°, more particularly between 45° and 65°. In the process, the joint seam 14 is preferably respectively illuminated from two sides along the profile thereof.

Hence, on one side, the joint seam 14 is illuminated at a small angle to the optical axis L by the illumination module 26a and at a large angle to the optical axis L by the illumination module 26b, and, on the other side of the joint seam 14, it is illuminated at a small angle to the optical axis L by the illumination module 26a' and at a large angle to the optical axis L by the illumination module 26b' such that an optimum illumination of the joint seam 14 is achieved.

The output power of the first illumination modules 26a, 26a' at a small angle to the optical axis L and the output power of the second illumination modules 26b, 26b' at a large angle to the optical axis L can be set independently of one another by means of a control device (not illustrated). Hence it is possible to switch between dark-field and bright-field illumination; however, it is also possible to increase the proportion of one or the other illumination type accordingly.

According to the invention, the measuring device 100 or 200 furthermore has an image processing unit, which images the image data obtained from the second optical sensor 34 onto a grid model of a topographic image, which was obtained by evaluating the profile of the triangulation light line 24, in order to create a calculated model view of a three-dimensional joint seam 14. To this end, use can be made of known mapping techniques. Thus, this method achieves an optimum simultaneous representation of two-dimensional and three-dimensional information. By rotating or changing the view of the extended 3D grid model, it is possible to see and assess the surface of the joint seam 14 together with the spatial information.

Thus, according to the invention, a measuring device is created for monitoring, during a joining process, a joining region 10 in a workpiece 16 with a region 12 to be joined and a joint seam 14, in which measuring device optimum sensor and optical imaging properties both for a triangulation application and for a greyscale image evaluation are combined in one sensor system. While a sensor that is as fast as possible is used for the triangulation, a sensor with a signal-to-noise ratio that is as good as possible and with a great dynamic range is used for the greyscale image evaluation. In order to be able to visualize very small faults, 1:1 imaging is required for the greyscale imaging.

The triangulation sensor can make do with size-reducing imaging because the laser line 24 can typically not be focussed on typical pixel sizes. The triangulation sensor 30 can be operated with image data greater than 3 kHz, with the greyscale image sensor typically operating in a range up to 100 Hz. Thus, the readout rate of the first optical sensor 30 is preferably greater than 1 kHz and the readout rate of the second optical sensor is preferably less than 500 Hz. Moreover, as a result of providing a different first optical sensor 30 and a second optical sensor 34 in the measuring device 100, 200 of the present invention, the exposure times, dynamic range, characteristics and other sensor properties can be tuned to their corresponding object.

The measuring device 100, 200 according to the invention can be used in a multiplicity of fields of application; thus, for example, it can be used for identifying welding edges to guide welding lasers, for inspecting the quality of welded joints of all types in the case of the greatest demands in respect of quality, for inspecting the quality of adhesive beads, for measuring the geometry and monitoring surfaces while at the same time inspecting the surface composition, and for 2D and 3D measurement of workpieces.

A user can carry out the necessary 3D measurement according to the generally accepted light-section method at very high frequency by using the novel sensor system, and a greyscale image evaluation can be carried out in parallel. Said user can also measure regions next to the joining position 48 using the triangulation method via the large object region. The user has a large depth of focus with simultaneous required image sharpness for the greyscale image evaluation. After the fusion of the data, the user has an optimum spatial representation of the texture of the joint seam 14 to be inspected or to be monitored. The lateral extent of faults is completely independent of the sensor advance speed.

The invention claimed is:

1. An optical measuring device for monitoring a joining region in a workpiece, comprising:
    at least one light-section device with a first light source, which casts a light fan in a direction of the workpiece in order to create a triangulation light line within the joining region on the workpiece, the triangulation light line intersecting a joint seam in the joining region;
    a first optical sensor with a first observation beam path for spatially resolved imaging of the triangulation light line projected onto the joint seam;
    a second optical sensor with a second observation beam path for spatially resolved imaging of the joint seam, with the second observation beam path being coaxially coupled into the first observation beam path and with the first optical sensor and the second optical sensor using a common objective lens;
    at least one first illumination module for homogeneous illumination of the joining region of the workpiece at a first angle to an optical axis of the common objective lens;
    at least one second illumination module for homogenous illumination of the joining region of the workpiece at a second angle, larger than the first angle, to the optical axis of the objective lens; and
    a control device, which, as a result of different actuation of the at least one first illumination module and of the at least one second illumination module at different periods of time, alternates between a dark-field and a bright-field illumination or sets a ratio of the intensities of the bright-field illumination and the dark-field illumination with respect to one another,
    wherein a readout rate of the first optical sensor is greater than 1 kHz and a readout rate of the second optical sensor is less than 500 Hz.

2. The optical measuring device according to claim 1, wherein the readout rate of the first optical sensor is greater than 3 kHz and the readout rate of the second optical sensor is less than 100 Hz.

3. The optical measuring device according to claim 1, further comprising a first beam splitter that coaxially couples the second observation beam path of the second optical sensor into the first observation beam path of the first optical sensor.

4. The optical measuring device according to claim 1, wherein a sensor surface of the second optical sensor and the light fan, to be projected onto the workpiece, of the at least one light-section device are arranged with respect to one another such that a Scheimpflug condition is satisfied for the image of the triangulation light line which intersects the joint seam.

5. The optical measuring device according to claim 1, further comprising an image processing unit, which images image data from the second optical sensor onto a grid model of a topographic image obtained by evaluating a profile of the triangulation light line in order to generate a calculated model view of a three-dimensional joint seam.

6. The optical measuring device according to claim 1, wherein the first optical sensor has a linear characteristic and the second optical sensor has a lin-log characteristic.

7. The optical measuring device according to claim 1, wherein optical band-pass filters are provided upstream of the first optical sensor and second optical sensor in the first observation beam path and the second observation beam path, and
    wherein pass wavelength ranges of the optical band-pass filters are tuned to emission wavelengths of the first light source of the light-section device.

8. The optical measuring device according to claim 1, wherein the at least one illumination module is embodied as an LED module and operated in a pulsed manner.

9. The optical measuring device according to claim 1, wherein the first light source of the at least one light-section device comprises a diode laser.

10. A joining head for joining a workpiece by means of a joining device, comprising the measuring device according to claim 1.

11. The joining head according to claim 10, wherein the joining device is a laser-welding device, a gas metal arc welding device or an adhesive-bead device.

12. A laser welding head for welding a workpiece by means of a laser beam, comprising:
    a housing, through which a beam path for the laser beam is routed and which has a focusing optical system for focusing the laser beam onto a joining position, of the workpiece, within a joining region; and
    the optical measuring device according to claim 1, with the at least one light-section device being fixedly connected to the housing such that the light fan cast onto the workpiece is at a fixed angle to an optical axis (L) of the focusing optical system, and with the first observation beam path and the second observation beam path being coaxially coupled into a laser beam path (L) by means of a second beam splitter.

* * * * *